(12) United States Patent
Li et al.

(10) Patent No.: US 10,997,439 B2
(45) Date of Patent: May 4, 2021

(54) OBSTACLE AVOIDANCE REMINDING METHOD, ELECTRONIC DEVICE AND COMPUTER-READABLE STORAGE MEDIUM THEREOF

(71) Applicant: CLOUDMINDS (BEIJING) TECHNOLOGIES CO., LTD., Beijing (CN)

(72) Inventors: Ye Li, Beijing (CN); Yimin Lin, Beijing (CN); Shiguo Lian, Beijing (CN)

(73) Assignee: CLOUDMINDS (BEIJING) TECHNOLOGIES CO., LTD., Beijing (CN)

( * ) Notice: Subject to any disclaimer, the term of this patent is extended or adjusted under 35 U.S.C. 154(b) by 63 days.

(21) Appl. No.: 16/504,693

(22) Filed: Jul. 8, 2019

(65) Prior Publication Data
US 2020/0012869 A1 Jan. 9, 2020

(30) Foreign Application Priority Data
Jul. 6, 2018 (CN) .......................... 201810738940.9

(51) Int. Cl.
*G06K 9/00* (2006.01)
*G06T 7/50* (2017.01)

(52) U.S. Cl.
CPC ..... *G06K 9/00805* (2013.01); *G06K 9/00825* (2013.01); *G06T 7/50* (2017.01); *G06T 2207/10028* (2013.01); *G06T 2207/30252* (2013.01)

(58) Field of Classification Search
CPC .. G06K 9/00805; G06K 9/00825; G06T 7/50; G06T 2207/10028; G06T 2207/30252
See application file for complete search history.

(56) References Cited

U.S. PATENT DOCUMENTS

| 9,946,264 | B2* | 4/2018 | Liao ..................... G05D 1/0253 |
| 10,247,830 | B2* | 4/2019 | Hosoya ................... G01S 19/49 |
| 10,365,657 | B2* | 7/2019 | Tokuyama ........... G05D 1/0246 |
| 10,489,686 | B2* | 11/2019 | Vallespi-Gonzalez ...................... G06K 9/00805 |
| 10,591,927 | B2* | 3/2020 | Zhang .................... A01G 9/143 |

(Continued)

FOREIGN PATENT DOCUMENTS

| CN | 101549683 | 10/2009 |
| CN | 101976460 A | 2/2011 |

(Continued)

OTHER PUBLICATIONS

International Search Report dated Sep. 6, 2019; PCT/CN2019/091674.
1st Office Action dated Jan. 17, 2020 by the CN Office.

*Primary Examiner* — Gregory M Desire

(57) ABSTRACT

An obstacle avoidance reminding method includes: performing ground detection based on acquired image data to acquire ground information of a road; performing passability detection based on the acquired ground information, and determining a traffic state of the road; if it is determined that the road is impassable, performing road condition detection for the road to acquire a first detection result, and performing obstacle detection for the road to acquire a second detection result; and determining obstacle avoidance reminding information based on the first detection result and the second detection result.

12 Claims, 6 Drawing Sheets

(56) References Cited

U.S. PATENT DOCUMENTS

| | | | |
|---|---|---|---|
| 10,769,793 B2* | 9/2020 | Chen | G05D 1/024 |
| 2008/0012726 A1* | 1/2008 | Publicover | G08G 1/096791 |
| | | | 340/932 |
| 2008/0189040 A1* | 8/2008 | Nasu | G08G 1/163 |
| | | | 701/301 |
| 2015/0092056 A1* | 4/2015 | Rau | G06K 9/00791 |
| | | | 348/148 |
| 2015/0302591 A1* | 10/2015 | Kim | B60R 1/00 |
| | | | 382/103 |
| 2016/0210735 A1* | 7/2016 | Fukushima | G06K 9/00805 |
| 2018/0061231 A1* | 3/2018 | Publicover | G08G 1/0965 |
| 2020/0012869 A1* | 1/2020 | Li | G06T 7/50 |

FOREIGN PATENT DOCUMENTS

| | | |
|---|---|---|
| CN | 104808209 A | 7/2015 |
| CN | 105073545 A | 11/2015 |
| CN | 105204511 A | 12/2015 |
| CN | 105425803 A | 3/2016 |
| CN | 105652873 A | 6/2016 |
| CN | 106686165 A | 5/2017 |
| CN | 107454969 A | 12/2017 |
| CN | 107635060 A | 1/2018 |
| CN | 108007436 A | 5/2018 |
| CN | 109002039 A | 12/2018 |
| EP | 2605185 A2 | 6/2013 |
| JP | 2017015601 A | 1/2017 |

* cited by examiner

OBSTACLE AVOIDANCE REMINDING METHOD, ELECTRONIC DEVICE AND COMPUTER-READABLE STORAGE MEDIUM THEREOF

CROSS-REFERENCE TO RELATED APPLICATIONS

This application is a continuation of Chinese Application No. CN201810738940.9, with a filing date of Jul. 6, 2018, the entire contents of which are incorporated herein by reference.

TECHNICAL FIELD

The present application relates to the technical field of computer vision, and in particular, relates to an obstacle avoidance reminding method, and an electronic device and a computer-readable storage medium thereof.

BACKGROUND

In fields such as blind guiding, robots, autopilot and the like, with developments of robots and unmanned driving technologies, obstacle avoidance reminding becomes an extremely important technology. The obstacle avoidance reminding technology provides important technical supports for auto-navigated robots and route planning robots.

SUMMARY

An embodiment of the present application provides an obstacle avoidance reminding method. The method includes: performing ground detection based on acquired image data to acquire ground information of a road; performing passability detection based on the acquired ground information, and determining a traffic state of the road; if it is determined that the road is impassable, performing road condition detection for the road to acquire a first detection result, and performing obstacle detection for the road to acquire a second detection result; and determining obstacle avoidance reminding information based on the first detection result and the second detection result.

Another embodiment of the present application provides a electronic device. The electronic device includes: at least one processor; and a memory communicably connected to the at least one processor; and the memory stores instructions executable by the at least one processor, the instructions, when being executed by the at least one processor, cause the at least one processor to perform the obstacle avoidance reminding method.

Still another embodiment of the present application provides a non-volatile computer-readable storage medium. The non-volatile computer-readable storage medium stores a computer program; wherein the computer program, when being executed by a processor, causes the processor to perform the obstacle avoidance reminding method.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the technical solutions and advantages of the present application, some embodiments of the present application are described in detail hereinafter with reference to the accompanying drawings. It should be understood that the specific embodiments described herein are only intended to explain the present application instead of limiting the present application.

During studies of the related art, the inventors have identified that obstacle avoidance reminding in the related art is generally directed to passability detection with respect to a front region, such that whether a road is passable or not is fed back. However, specific information of the obstacle may not be acquired.

Figure 1:
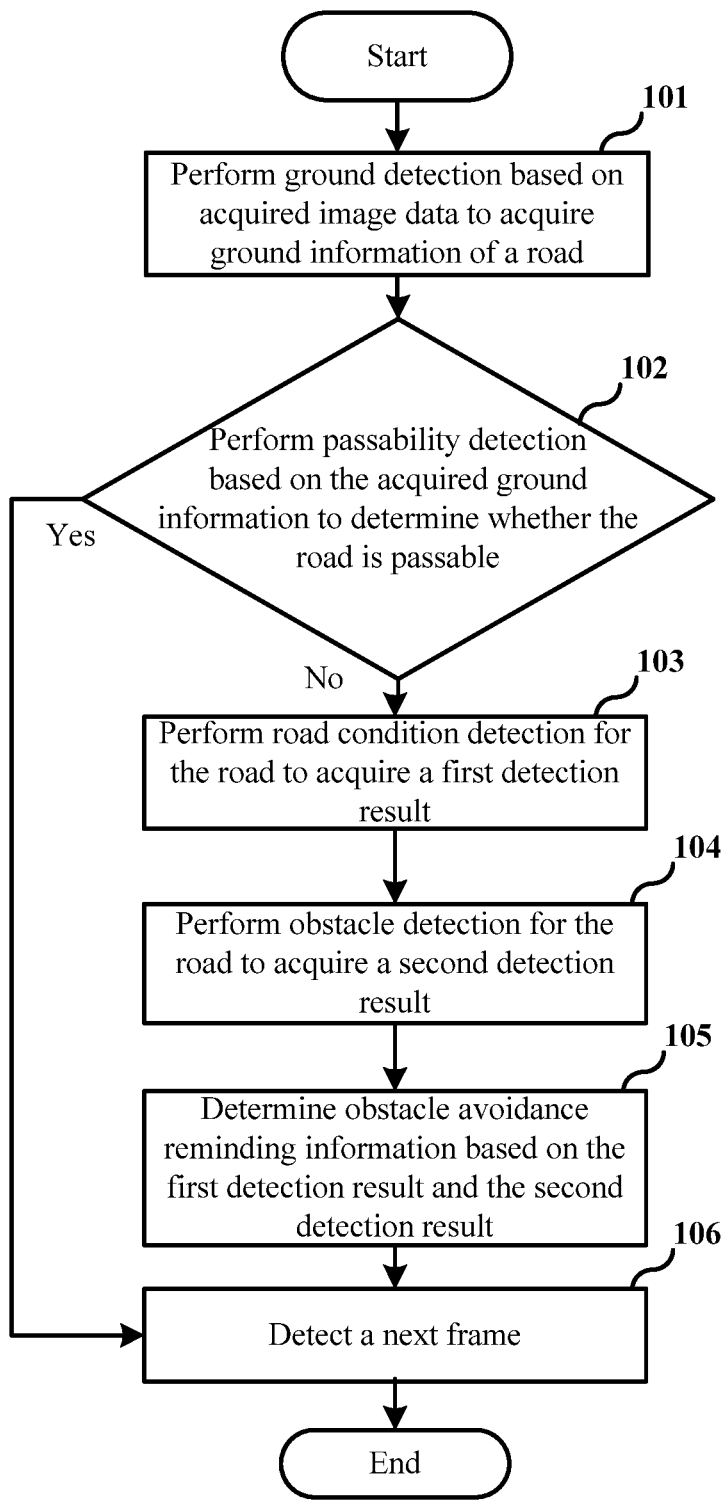
FIG. 1 is a flowchart of an obstacle avoidance reminding method according to a first embodiment of the present application.

A first embodiment of the present application provides an obstacle avoidance reminding method. The obstacle avoidance reminding method is performed by a blind guiding helmet or a smart robot or the like smart device. A specific process of the obstacle avoidance reminding method is as illustrated in FIG. 1. The process includes the following steps:

In step 101, ground detection is performed based on acquired image data to acquire ground information of a road.

Specifically, in this embodiment, three-dimensional point cloud is established for the road based on the acquired image data, and ground detection is performed in the three-dimensional point cloud to acquire ground information. In practice, the three-dimensional point cloud may be established for the road in a plurality of ways, and the specific practice of establishing the three-dimensional point cloud is not limited in this embodiment.

In a specific implementation, the image data is acquired, wherein the image data includes a depth image and a posture angle of a camera; a scale normalization factor is calculated based on the depth image and a predetermined normalization scale; a scale-normalized depth image is calculated based on the depth image and the scale normalization factor; a three-dimensional point cloud under a coordinate system of a camera is constructed based on the depth image experience scale normalization; and a three-dimensional point cloud under a world coordinate system is constructed based on the three-dimensional point cloud under the coordinate system of the camera and a posture of the camera.

Specifically, the scale normalization factor is calculated by using formula (1) as follows:

$$S = \frac{Norm}{\max(W, H)} \quad (1)$$

In the above formula, S denotes the scale normalization factor, W denotes a depth of the depth image, H denotes a width of the depth image, and Norm denotes the predetermined normalization scale. Norm is a known parameter that is predetermined. In specific practice, if depth images of contiguous frames need to be processed to establish the three-dimensional point cloud, the same normalization scale is used for processing each frame of depth image.

The scale-normalized depth image is calculated by using formula (2) as follows:

$$\begin{cases} W_s = W \times S \\ H_s = H \times S \end{cases} \quad (2)$$

In the above formula, $W_s$ denotes a width of the scale-normalized depth image, and $H_s$ denotes a height of the scale-normalized depth image. The scale-normalized depth image may be determined based on $W_s$ and $H_s$.

Specifically, the three-dimensional point cloud under the coordinate system of the camera is constructed by using formula (3) based on the normalized depth image, and the three-dimensional point cloud under the coordinate system of the camera is represented by $P(X_c, Y_c, Z_c)$. Since each pixel in the depth image contains a distance value from the camera to a photograph object, pixel coordinates in the depth image are transformed to coordinates in the coordinate system of the camera by using formula (3), and the three-dimensional point cloud under the coordinate system of the camera is constructed, as illustrated by formula (3) as follows:

$$\begin{bmatrix} u \\ v \\ 1 \end{bmatrix} = \frac{1}{Z_c} M_{3\times 4} \begin{bmatrix} X_c \\ Y_c \\ Z_c \\ 1 \end{bmatrix} \quad (3)$$

In the above formula, u and v denotes coordinate values in the normalized depth image, $X_c$, $Y_c$ and $Z_c$ denote coordinate values of point P in the coordinate system of the camera, $M_{3\times 4}$ denotes an intrinsic parameter matrix of the camera, and $Z_c$ denotes a depth value of the scale-normalized depth image, that is, the distance value from the camera to the photograph object, which is a known parameter.

Based on a coordinate transformation relation between the coordinate system of the camera and the world coordinate system, the three-dimensional point cloud $P(X_c, Y_c, Z_c)$ in the coordinate system of the camera is transformed to a three-dimensional point cloud $P(X_w, Y_w, Z_w)$ in the world coordinate system, wherein the transformation relation is represented by formula (4) as follows:

$$\begin{bmatrix} X_w \\ Y_w \\ Z_w \end{bmatrix} = \begin{bmatrix} \cos\gamma & -\sin\gamma & 0 \\ \sin\gamma & \cos\gamma & 0 \\ 0 & 0 & 1 \end{bmatrix} * \begin{bmatrix} \cos\beta & 0 & \sin\beta \\ 0 & 1 & 0 \\ -\sin\beta & 0 & \cos\beta \end{bmatrix} * \begin{bmatrix} 1 & 0 & 0 \\ 0 & \cos\alpha & -\sin\alpha \\ 0 & \sin\alpha & \cos\alpha \end{bmatrix} * \begin{bmatrix} X_c \\ Y_c \\ Z_c \end{bmatrix} \quad (4)$$

In the above formula, $X_w$, $Y_w$ and $Z_w$ denote coordinate values of any point P in the three-dimensional point cloud in the world coordinate system, $X_c$, $Y_c$ and $Z_c$ denote coordinate values of point P in the coordinate system of the camera, α denotes an included angle defined by the camera and $X_w$ axis in the world coordinate system, β denotes an included angle defined by the camera and $Y_w$ axis in the world coordinate system, and γ denotes an included angle defined by the camera and $Z_w$ axis in the world coordinate system.

Figure 2:
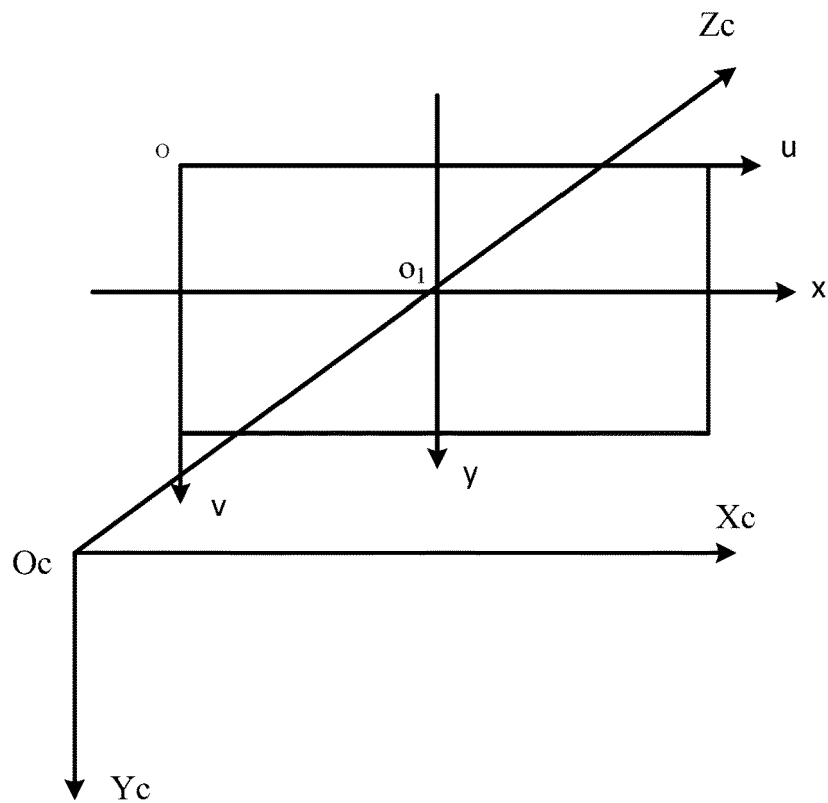
FIG. 2 is a relation diagram of a pixel coordinate system and a camera coordinate system according to the first embodiment of the present application.
Figure 3:
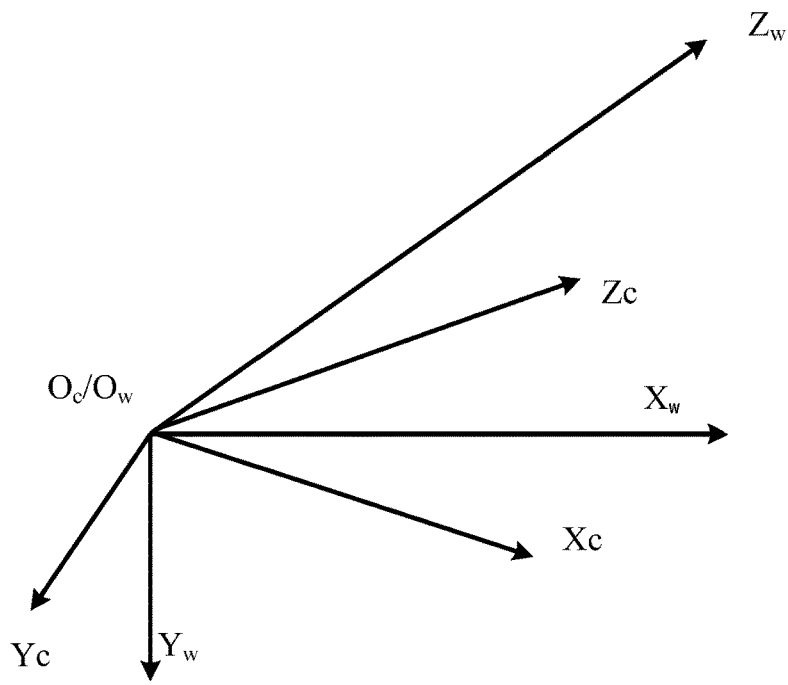
FIG. 3 is a relation diagram of a camera coordinate system and a world coordinate system according to the first embodiment of the present application.

It should be noted that during determining a direction of the coordinate system, assume that a coordinate system of an image is $o_1$-xy, then a relation between a coordinate system Oc-XcYcZc of the camera and a coordinate system o-uv of a pixel is as illustrated in FIG. 2, and a relation between coordinate system Oc-XcYcZc of the camera and a world coordinate system Ow-XwYwZw is as illustrated in FIG. 3.

In FIG. 2, a Cartesian coordinate system o-uv with pixels as the unit is established by using an upper left corner of the depth image as an origin, wherein an abscissa u denotes a serial number of the column where the pixel is located, and an ordinate v denotes a serial number of the row where the pixel is located. An intersection between an optical axis of the camera and a plane of the depth graph is defined as the origin $o_1$ of the coordinate system oi-xy of the image, and the x axis is parallel to the u axis, the y axis is parallel to the v axis. The coordinate system of the camera Oc-XcYcZc uses an optical center Oc of the camera as the origin of the coordinates, the Xc axis and the Yc axis are respectively parallel to the x axis and the y axis in the coordinate system of the image, and the Zc axis is the optical axis of the camera and is perpendicular to the plane of the image at an intersection $o_1$.

As illustrated in FIG. 3, the origin Ow of the world coordinate system Ow-XwYwZw coincides with the origin Qc of the coordinate system of the camera, and both of the origins are optical centers of the camera. A horizontal leftward direction is defined as a positive direction of the Xw axis, a perpendicular downward direction is defined as a positive direction of the Yw axis, a direction perpendicular to the XwOwYw plane and pointing to a front direction is defined as a positive direction of the Zw axis, and the world coordinate system is established.

Generally, the performing the ground detection in the three-dimensional point cloud to acquire the ground information of the road specifically includes: detecting a ground height in the three-dimensional point cloud; determining obstacle information on the ground height; using the ground height and the obstacle information as the ground information of the road. In this way, specific conditions of the road are determined, and accuracy of the obstacle avoidance reminding information is ensured.

The determining obstacle information on the ground height specifically includes: determining a ground position of the road based on the ground height; and performing obstacle detection for the ground position of the road, and generating the obstacle information on the ground height based on an obstacle detection result.

In step 102, passability detection is performed based on the acquired ground information to determine whether the road is passable. If it is determined that the road is impassable, step 103 to step 106 are performed, and otherwise step 106 is performed.

Specifically, during determining the traffic state of the road, a pre-warning region is determined based on the ground information of the road, and the traffic state of the road is determined by detecting a traffic state of the pre-warning region.

In step 103, road condition detection is performed for the road to acquire a first detection result.

Specifically, when it is determined that the road is impassable, causes to the impassable road need to be refined, and detailed obstacle avoidance reminding information is provided for users with respect to the different causes to the impassable road. The causes generally include: obstacles on the road, wherein the obstacles refer to objects protruding from the group and placed on the ground; and sags on the road (the sag is a special type of road obstacle in the present application).

The first detection result is acquired by detecting a sag on the road. Specifically, this process includes: determining a ground position of the road based on the ground height; and performing traffic state detection for the ground position of the road to determine sag information on the road, and using the sag information as the first detection result; wherein the sag information comprises existence of the sag or not and a position of the sag.

In step 104, obstacle detection is performed for the road to acquire a second detection result.

Specifically, the acquired image data is partitioned to obtain M×N partitions, wherein M and N are both integers greater than 1; information of an obstacle in each of the partitions is determined; a pre-warning grade of each of the partitions is determined based on the information of the obstacle in each of the partitions; a decision suggestion for passing the road is determined based on the pre-warning grade of each of the partitions; and the pre-warning grade of each of the partitions and the decision suggestion for passing the road are used as the second detection result.

Figure 4:
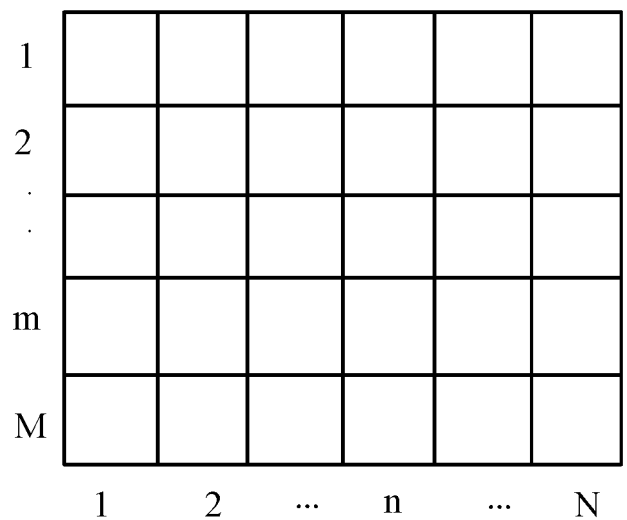
FIG. 4 is a schematic diagram of partitions of image data according to the first embodiment of the present application.
Figure 5:
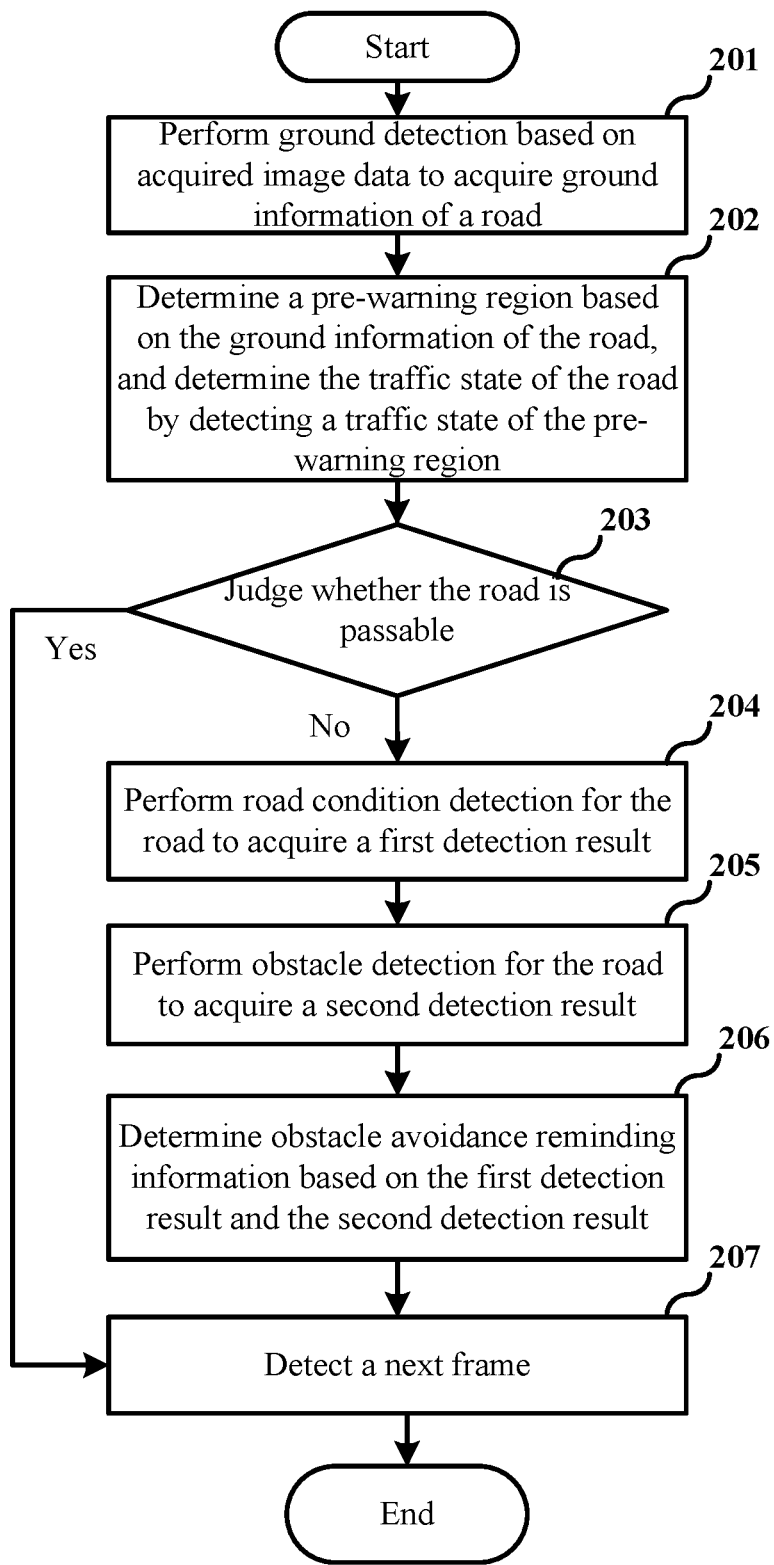
FIG. 5 is a flowchart of an obstacle avoidance reminding method according to a second embodiment of the present application.

For example, during partitioning of the image data, as illustrated in the schematic diagram of partitions of the image data in FIG. 4, the image data is partitioned and each partition is marked. In a horizontal direction, the image data is partitioned into N parts, and in a vertical direction, the image data is partitioned into M parts, and a position of each partition is represented by the number of parts in the horizontal direction plus the number of parts in the vertical direction, for example, (1, 2), (m, n) or the like.

The determining information of the obstacle in each of the partitions includes: detecting the obstacle in each of the partition and determining the partition including the obstacle, and a geometric invariable matrix $H_u(m,$ of the obstacle is calculated after the obstacle is detected in the partition, wherein (m, n) denotes the position of the partition. Nevertheless, the information of the obstacle in each of the partitions may also be acquired in other image processing fashions. For example, the position, the geometric features and the like information of the obstacle in a partition are determined by means of image identification. The above only gives only illustrative description, but sets no limitation.

The determining a pre-warning grade of each of the partitions based on the information of the obstacle in each of the partitions specifically includes: determining a weight of each of the partitions based on the information of the obstacle in each of the partitions; and determining the pre-warning grade of each of the partitions based on the weight of each of the partitions, wherein the weight is positively proportional to the pre-warning grade. The higher the weight, the higher the pre-warning grade, which indicates a low possibility that the partition is passable. For example, the weight is within the range of 0 to 5, the pre-warning grade is grade 1, and in this case, the obstacle is smaller and it may be considered that no obstacle is present if passability of the road is not affected; the weight is within the range of 6 to 10, the pre-warning grade is grade 2, and in this case, an obstacle is present but the road is passable, and passengers need to pay attention to the obstacle; and the weight of within the range of 11 to 15, the pre-warning grade is grade 3, and in this case, the obstacle is very large, and the road is impassable.

The weight of each of the partitions may be calculated by using formula (5) as follows:

$$W_{(m,n)} = \frac{H_u(m,n)}{\sum S_{(m,n)}} \qquad (5)$$

In the above formula, $H_u(m, n)$ denotes an area of a to-be-detected partition at a partition position (m, n), $\Sigma S_{(m,n)}$ denotes an area of all the partitions of the image data, $W_{(m,n)}$ denotes a weight of the obstacle in the partition at the partition position (m, n), and $H_u(m, n)$ denotes a geometric invariable matrix of the obstacle in the partition at the partition position (m, n).

Specifically, the determining a decision suggestion for passing the road based on the pre-warning grade of each of the partitions includes: calculating a gradient value of each of the partitions, wherein the gradient value is calculated based on the weight of the partition and weights of adjacent partitions of the partition; determining a maximum gradient value of the gradient values of all the partitions; and determining the decision suggestion for passing the road based on the maximum gradient value, wherein the decision suggestion comprises an optimal passing direction, and using a direction of the maximum gradient value as an optimal passing direction in the decision suggestion.

It should be noted that, in this embodiment, after it is determined that the road is impassable in step 102, step 103 may be firstly performed and then step 104 may be performed, or step 103 and step 104 may be simultaneously performed. This embodiment sets no limitation to the sequence of performing step 103 and step 104.

In step 105, obstacle avoidance reminding information is determined based on the first detection result and the second detection result.

A comprehensive analysis is made based on the first detection result and the second detection result, and the obstacle avoidance reminding information may be determined based on an analysis result.

In specific practice, if it is determined from the first detection result that a sag is existent in the front and it is determined from the second detection result that the pre-warning grade is grade 2, a decision suggestion indicates turning right and moving forward. In this case, the acquired obstacle avoidance reminding information is: turning right and move forward since the sag and obstacle are existent in the front. In this way, the user may quickly and safely pass away the obstacle based on the obstacle avoidance reminding information. In addition, the obstacle avoidance reminding information may be one or more information combinations in voice information or image information, and an alarm signal is generated based on the obstacle avoidance reminding information, such that the user is reminded and hence avoid the obstacle based on the reminding information. In this embodiment, the specific fashion of giving the obstacle avoidance reminding information is not limited.

In step 106, a next frame is detected.

It should be noted that the obstacle avoidance reminding method is applied to a navigation device based on contiguous frames of image data. Therefore, with the method, continuous detection may be performed for a next frame of image data.

As compared with the related art, in the obstacle avoidance reminding method according to this embodiment, ground detection is performed based on the acquired image data, passability detection is performed based on the ground detection, and road condition detection and obstacle detection are performed when it is determined that the road is impassable to determine obstacle avoidance reminding information, such that the user may quickly and safely pass away the obstacle.

A second embodiment of the present application provides an obstacle avoidance reminding method. Based on the first embodiment, the second embodiment makes a further improvement: The passability detection performed based on the acquired ground information and the determination of the traffic state of the road in the first embodiment are specifically described hereinafter. A flowchart of the obstacle avoidance reminding method according to this embodiment is as illustrated in FIG. 2.

Specifically, this embodiment includes step 201 to step 207, wherein step 201 is approximately the same as step 101 in the first embodiment, and step 204 to step 207 are approximately the same as step 103 to step 106 in the first embodiment, which are thus not described herein any further. Hereinafter, the differences are mainly described. For or technical details that are not illustrated in detail in this embodiment, reference may be made to the description of the obstacle avoidance reminding method in the first embodiment.

After step 201 is performed, step 202 is performed.

In step 202, a pre-warning region is determined based on the ground information of the road, and the traffic state of the road is determined by detecting a traffic state of the pre-warning region.

This step specifically includes: constructing spatial coordinates of the pre-warning region; determining a height of the pre-warning region under the spatial coordinates based on the ground height; determining a width and a distance of the pre-warning region under the spatial coordinates based on the obstacle information; adjusting a position of the pre-warning region based on the ground height; and determining the traffic state of the road by detecting a traffic state of the pre-warning region experiencing position adjustment; wherein the traffic state comprises a passable state or an impassable state.

It should be noted that the pre-warning region is determined based on the three-dimensional point cloud under the world coordinate system. Specifically, the plane YwOwZw in the world coordinate system is used as a symmetric plane, a three-dimensional spatial region of the pre-warning region is constructed using the positive direction of the Zw axis, and the three-dimensional spatial region is the pre-warning region. The spatial region of the pre-warning region is denoted by vBox(x, y, z), wherein x, y and z respectively denote a width, a height and a distance of the pre-warning region. The distance of the pre-warning region is determined based on a speed of the user, the width and height of the pre-warning region are determined based on an appearance of the user, and the pre-warning region is not less than a minimum space which ensures that the user may be passed.

The road is not flat, and the ground information includes a ground height. Based on the ground height, the road may be divided to an uphill section, a downhill section and a flat section. Therefore, after the pre-warning region is determined, the position of the pre-warning region needs to be adjusted based on the ground height.

In specific practice, a real-time ground height is determined based on an adaptive ground detection method, or determined based on point cloud data indicating the road information in the three-dimensional point cloud; and the position of the pre-warning region is dynamically adjusted based on variations of the ground height, such that the pre-warning region is just over the ground. In this way, interference from the ground is prevented, and small and short obstacles may not be missed. Specifically, adjustment of the pre-warning region may be determined based on the following formula:

$$vBox_1 = vBox(x, H+y+\sigma, z) \qquad (6)$$

In the above formula, H denotes the real-time ground height, σ denotes a dynamic adjustment margin, $vBox_1$ denotes an adjusted pre-warning region, and x, y and z respectively denote the width, height and distance of the pre-warning region.

Specifically, a traffic state of the position-adjusted pre-warning region may be detected based on the obstacle information of the road, wherein the traffic state includes a passable state and an impassable state, and meanwhile includes the position of a passable region and a width, a height and the like of the passable region. The traffic state of the current road may be determined based on the traffic state of the pre-warning region.

In step 203, whether the road is passable is judged; if the road is impassive, step 204 to step 207 are performed; and otherwise, step 207 is performed.

In step 204, road condition detection is performed for the road to acquire a first detection result.

In step 205, obstacle detection is performed for the road to acquire a second detection result.

It should be noted that, in this embodiment, after it is determined that the road is impassable in step 203, step 204 may be firstly performed and then step 205 may be performed, or step 204 and step 205 may be simultaneously performed. This embodiment sets no limitation to the sequence of performing step 204 and step 205.

In step 206, obstacle avoidance reminding information is determined based on the first detection result and the second detection result.

In step 207, a next frame is detected.

Figure 6:
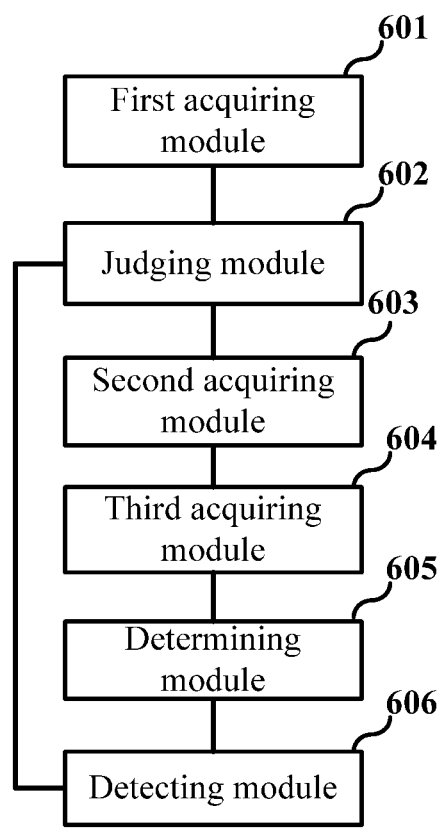
FIG. 6 is a flowchart of an obstacle avoidance reminding apparatus according to a third embodiment of the present application.

A third embodiment of the present application provides an obstacle avoidance reminding apparatus, and a specific structure of the obstacle avoidance reminding apparatus is as illustrated in FIG. 6.

As illustrated in FIG. 6, the obstacle avoidance reminding apparatus includes: a first acquiring module 601, a judging module 602, a second acquiring module 603, a third acquiring module 604, a determining module 605 and a detecting module 606.

The first acquiring module 601 is configured to perform ground detection based on acquired image data to acquire ground information of a road;

The judging module 602 is configured to perform passability detection based on the acquired ground information to determine whether the road is passable. If it is determined that the road is impassable, the second acquiring module 603 is executed, and otherwise the detecting module 606 is executed.

The second acquiring module 603 is configured to perform road condition detection for the road to acquire a first detection result.

The third acquiring module 604 is configured to perform obstacle detection for the road to acquire a second detection result.

The determining module 605 is configured to determine obstacle avoidance reminding information based on the first detection result and the second detection result.

The detecting module 606 is configured to detect a next frame.

It is apparent that this embodiment is an apparatus embodiment corresponding to the first embodiment, and may be practiced in cooperation with the first embodiment. The relevant technical details mentioned in the first embodiment shall still apply in this embodiment. For description brevity, such technical details are not described herein any further. Correspondingly, the relevant technical details mentioned in this embodiment shall also apply in the first embodiment.

Figure 7:
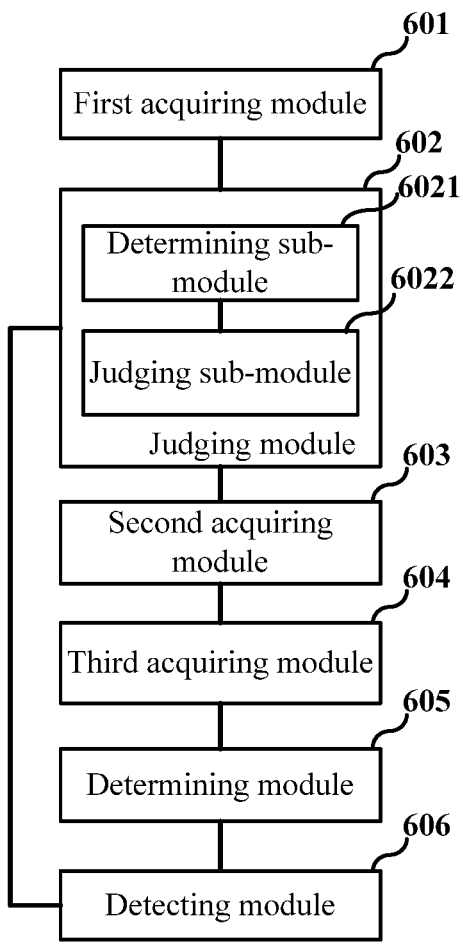
FIG. 7 is a schematic block diagram of an obstacle avoidance reminding apparatus according to a fourth embodiment of the present application.

A fourth embodiment of the present application provides an obstacle avoidance reminding apparatus. This embodiment is approximately the same as the third embodiment, and the specific structure of the apparatus is as illustrated in FIG. 7. A major improvement lies in that the fourth embodiment describes in detail the structure of the judging module 602 in the third embodiment.

The judging module 602 includes a determining sub-module 6021 and a judging sub-module 6022.

The determining sub-module 6021 is configured to determine a pre-warning region based on the ground information of the road, and determine the traffic state of the road by detecting a traffic state of the pre-warning region.

The judging sub-module 6022 is configured to judge whether the road is passable.

It is apparent that this embodiment is an apparatus embodiment corresponding to the second embodiment, and may be practiced in cooperation with the second embodiment. The relevant technical details mentioned in the second embodiment shall still apply in this embodiment. For description brevity, such technical details are not described herein any further. Correspondingly, the relevant technical details mentioned in this embodiment shall also apply in the second embodiment.

The above described apparatus embodiment is only an exemplary embodiment, which is not intended to limit the protection scope of the present application. In practice, a person skilled in the art would select some or all the modules to achieve the objective of the technical solution according to this embodiment, which is not limited herein.

Figure 8:
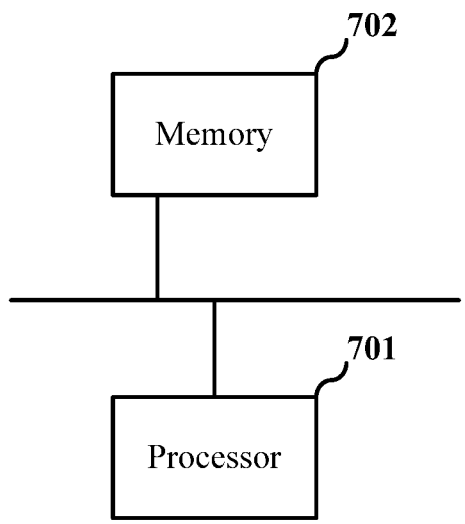
FIG. 8 is a schematic structural diagram of an electronic device according to a fifth embodiment of the present application.

A fifth embodiment of the present application provides an electronic device, and a specific structure of the electronic device is as illustrated in FIG. 8. The electronic device includes at least one processor 701, and a memory 702 communicably connected to the at least one processor 701. The memory 702 stores instructions that are executable by the at least one processor 710. The instructions, when being executed by the at least one processor 710, cause the at least one processor 701 to perform the obstacle avoidance reminding method.

In this embodiment, the processor 701 may be, for example, a central processing unit (CPU), and the memory 702 may be, for example, a random access memory (RAM). The at least one processor 701 and the memory 702 may be connected via a bus or in another fashion, and FIG. 7 uses the bus as an example. The memory 702 is a nonvolatile computer-readable storage medium, and may be used to store non-volatile software programs, non-volatile computer-executable programs and modules, such as program instructions/modules corresponding to the obstacle avoidance reminding method in the embodiments of the present application. The non-volatile software programs, instructions and modules stored in the memory 702, when being executed, cause the processor 701 to perform various function applications and data processing of a device, that is, performing the obstacle avoidance reminding methods according to the above method embodiments.

The memory 702 may also include a program storage area and a data storage area. The program storage area may store an operating system and an application implementing at least one function. The data storage area may store a list of options and the like. In addition, the memory may include a high speed random access memory, or include a non-volatile memory, for example, at least one disk storage device, a flash memory device, or another non-volatile solid storage device. In some embodiments, the memory 702 optionally includes the memory remotely arranged relative to the processor 701, and such remote memory may be connected to an external device over the network. Examples of the above network include, but not limited to, the Internet, Intranet, local area network, mobile communication network and a combination thereof.

One or more program modules are stored in the memory 702, which, when being executed by the at least one processor 701, perform the obstacle avoidance reminding method in any of the above method embodiments.

The above product may perform the methods according to the embodiments of the present application, have the corresponding function modules to perform the methods and achieve the corresponding beneficial effects. For technical details that are not illustrated in detail in this embodiment, reference may be made to the description of the methods according to the embodiments of the present application.

An eighth embodiment of the present application provides a computer-readable storage medium. The computer-readable storage medium stores a computer program, which, when being executed by a processor, may cause the processor to perform the obstacle avoidance reminding method according to any of the method embodiments of the present application.

Persons skilled in the art should understand that all or a part of the steps of the method in the above embodiments may be implemented by a program instructing relevant hardware. The program is stored in a storage medium, and includes several instructions to instruct a device (for example, a single-chip microcomputer or a chip) or processor to execute all or a part of the steps of the method in each embodiment of the present application. The storage medium includes various media capable of storing program code, for example, a USB flash disk, a removable hard disk, a read-only memory (ROM), a random access memory (RAM), a magnetic disk, or an optical disc.

Persons of ordinary skill in the art shall understand that the above embodiments are merely specific and exemplary embodiments for practicing the present application, and in practice, various modifications may be made to these embodiments in terms of formality and detail, without departing from the spirit and scope of the present application.

What is claimed is:

1. An obstacle avoidance reminding method, comprising:
performing ground detection based on acquired image data to acquire ground information of a road;
performing passability detection based on the acquired ground information, and determining a traffic state of the road;
if it is determined that the road is impassable, performing road condition detection for the road to acquire a first detection result, and performing obstacle detection for the road to acquire a second detection result; and
determining obstacle avoidance reminding information based on the first detection result and the second detection result,
wherein the performing passability detection based on the acquired ground information, and determining a traffic state of the road comprises:
determining a pre-warning region based on the ground information of the road, and determining the traffic state of the road by detecting a traffic state of the pre-warning region,
wherein the determining a pre-warning region based on the ground information of the road, and determining the traffic state of the road by detecting a traffic state of the pre-warning region comprises:
constructing spatial coordinates of the pre-warning region;
determining a height of the pre-warning region under the spatial coordinates based on the around height;
determining a width and a distance of the pre-warning region under the spatial coordinates based on the obstacle information;
adjusting a position of the pre-warning region based on the ground height; and
determining the traffic state of the road by detecting a traffic state of the pre-warning region experiencing position adjustment;
wherein the traffic state comprises a passable state or an impassable state.

2. The obstacle avoidance reminding method according to claim 1, wherein the performing ground detection based on acquired image data to acquire ground information of a road comprises:
establishing three-dimensional point cloud for the road based on the acquired image data; and
performing the ground detection in the three-dimensional point cloud to acquire the ground information of the road.

3. The obstacle avoidance reminding method according to claim 2, wherein the performing the ground detection in the three-dimensional point cloud to acquire the ground information of the road comprises:
detecting a ground height in the three-dimensional point cloud;
determining obstacle information on the ground height; and
using the ground height and the obstacle information as the ground information of the road.

4. The obstacle avoidance reminding method according to claim 3, wherein the determining obstacle information on the ground height comprises:
determining a ground position of the road based on the ground height; and
performing obstacle detection for the ground position of the road, and generating the obstacle information on the ground height based on an obstacle detection result.

5. The obstacle avoidance reminding method according to claim 2, wherein the establishing three-dimensional point cloud for the road based on the acquired image data comprises:
acquiring a depth image and a posture of the camera from the image date;
calculating a scale normalization factor based on the depth image and a predetermined normalization scale;
calculating a scale-normalized depth image based on the depth image and the scale normalization factor,
constructing a three-dimensional point cloud under a coordinate system of a camera based on the depth image experience scale normalization; and
constructing a three-dimensional point cloud under a world coordinate system based on the three-dimensional point cloud under the coordinate system of the camera and the posture of the camera.

6. The obstacle avoidance reminding method according to claim 1, wherein the performing road condition detection for the road to acquire a first detection result comprises:
determining a ground position of the road based on the ground height; and
performing traffic state detection for the ground position of the road to determine sag information on the road, and using the sag information as the first detection result;
wherein the sag information comprises existence of the sag or not and a position of the sag.

7. The obstacle avoidance reminding method according to claim 6, wherein the performing obstacle detection for the road to acquire a second detection result comprises:
partitioning the acquired image data to obtain M×N partitions, wherein M and N are both integers greater than 1;
determining information of an obstacle in each of the partitions;
determining a pre-warning grade of each of the partitions based on the information of the obstacle in each of the partitions;
determining a decision suggestion for passing the road based on the pre-warning grade of each of the partitions; and
using the pre-warning grade of each of the partitions and the decision suggestion for passing the road as the second detection result.

8. The obstacle avoidance reminding method according to claim 7, wherein the determining a pre-warning grade of each of the partitions based on the information of the obstacle in each of the partitions comprises:
determining a weight of each of the partitions based on the information of the obstacle in each of the partitions; and
determining the pre-warning grade of each of the partitions based on the weight of each of the partitions, wherein the weight is positively proportional to the pre-warning grade.

9. The obstacle avoidance reminding method according to claim 8, wherein the determining a decision suggestion for passing the road based on the pre-warning grade of each of the partitions comprises:
calculating a gradient value of each of the partitions, wherein the gradient value is calculated based on the weight of the partition and weights of adjacent partitions of the partition;

determining a maximum gradient value of the gradient values of all the partitions; and determining the decision suggestion for passing the road based on the maximum gradient value, wherein the decision suggestion comprises an optimal passing direction, and using a direction of the maximum gradient value as an optimal passing direction in the decision suggestion.

10. The obstacle avoidance reminding method according to claim 9, wherein upon the determining obstacle avoidance reminding information based on the first detection result and the second detection result, the method further comprises:

sending an alarm signal based on the obstacle avoidance reminding information.

11. An electronic device, comprising:

at least one processor, and a memory communicably connected to the at least one processor; wherein the memory stores instructions executable by the at least one processor, wherein, the instructions, when being executed by the at least one processor, cause the at least one processor to perform the steps of:

performing ground detection based on acquired image data to acquire ground information of a road;

performing passability detection based on the acquired ground information, and determining a traffic state of the road;

if it is determined that the road is impassable, performing road condition detection for the road to acquire a first detection result, and performing obstacle detection for the road to acquire a second detection result; and determining obstacle avoidance reminding information based on the first detection result and the second detection result, wherein the performing passability detection based on the acquired ground information, and determining a traffic state of the road comprises:

determining a pre-warning region based on the ground information of the road, and determining the traffic state of the road by detecting a traffic state of the pre-warning region, wherein the determining a pre-warning region based on the ground information of the road, and determining the traffic state of the road by detecting a traffic state of the pre-warning region comprises:

constructing spatial coordinates of the pre-warning region;

determining a height of the pre-warning region under the spatial coordinates based on the around height;

determining a width and a distance of the pre-warning region under the spatial coordinates based on the obstacle information;

adjusting a position of the pre-warning region based on the ground height; and determining the traffic state of the road by detecting a traffic state of the pre-warning region experiencing position adjustment;

wherein the traffic state comprises a passable state or an impassable state.

12. A computer-readable storage medium, which stores a computer program; wherein the computer program, when being executed by a processor, causes the processor to perform the steps of:

performing ground detection based on acquired image data to acquire ground information of a road;

performing passability detection based on the acquired ground information, and determining a traffic state of the road, comprising determining a pre-warning region based on the ground information of the road, and determining the traffic state of the road by detecting a traffic state of the pre-warning region;

if it is determined that the road is impassable, performing road condition detection for the road to acquire a first detection result, and performing obstacle detection for the road to acquire a second detection result; and determining obstacle avoidance reminding information based on the first detection result and the second detection result, wherein the performing passability detection based on the acquired ground information, and determining a traffic state of the road comprises:

determining a pre-warning region based on the ground information of the road, and determining the traffic state of the road by detecting a traffic state of the pre-warning region, wherein the determining a pre-warning region based on the ground information of the road, and determining the traffic state of the road by detecting a traffic state of the pre-warning region comprises:

constructing spatial coordinates of the pre-warning region;

determining a height of the pre-warning region under the spatial coordinates based on the ground height;

determining a width and a distance of the pre-warning region under the spatial coordinates based on the obstacle information;

adjusting a position of the pre-warning region based on the ground height; and determining the traffic state of the road by detecting a traffic state of the pre-warning region experiencing position adjustment;

wherein the traffic state comprises a passable state or an impassable state.

\* \* \* \* \*